United States Patent [19]
Martin et al.

[11] 3,930,282
[45] Jan. 6, 1976

[54] MACHINE FOR PROCESSING THE BACKS OF POULTRY

[75] Inventors: Eugene G. Martin; Dale M. Risser, both of Ephrata, Pa.

[73] Assignee: Victor F. Weaver, Inc., New Holland, Pa.

[22] Filed: Sept. 19, 1974

[21] Appl. No.: 507,437

[52] U.S. Cl. ................................. 17/11
[51] Int. Cl.² ......................... A22C 21/00
[58] Field of Search ............... 17/11, 50, 52

[56] References Cited
UNITED STATES PATENTS

| | | | |
|---|---|---|---|
| 3,406,425 | 10/1968 | Hill | 17/11 |
| 3,451,097 | 6/1969 | Knight | 17/11 |
| 3,480,991 | 12/1969 | Edwards, Sr. | 17/11 |
| 3,714,682 | 2/1973 | Harben, Jr. | 17/11 |
| 3,731,344 | 5/1973 | Phares et al. | 17/11 |
| 3,744,087 | 7/1973 | Vertegaal | 17/11 |
| 3,769,656 | 11/1973 | Jahnke | 17/11 |
| 3,837,045 | 9/1974 | Blacker | 17/11 |

*Primary Examiner*—Louis G. Mancene
*Assistant Examiner*—James D. Hamilton
*Attorney, Agent, or Firm*—C. Hercus Just; Samuel M. Learned, Jr.

[57] ABSTRACT

A machine designed to remove skin from the backs of poultry automatically and mechanically by conveying the back carcass members sequentially through a machine having processing stations operable in sequence to sever the kidney retaining membranes and remove the kidneys by vacuum; position the tail for mechanical maceration and removal by a set of coarse intermeshing rotating helical gear members; and, macerate and remove the skin from the back carcass member by a second set of intermeshing rotating helical gears of finer pitch than the first set, followed by the back carcass members, free of skin, are discharged to a collection receptacle.

8 Claims, 11 Drawing Figures

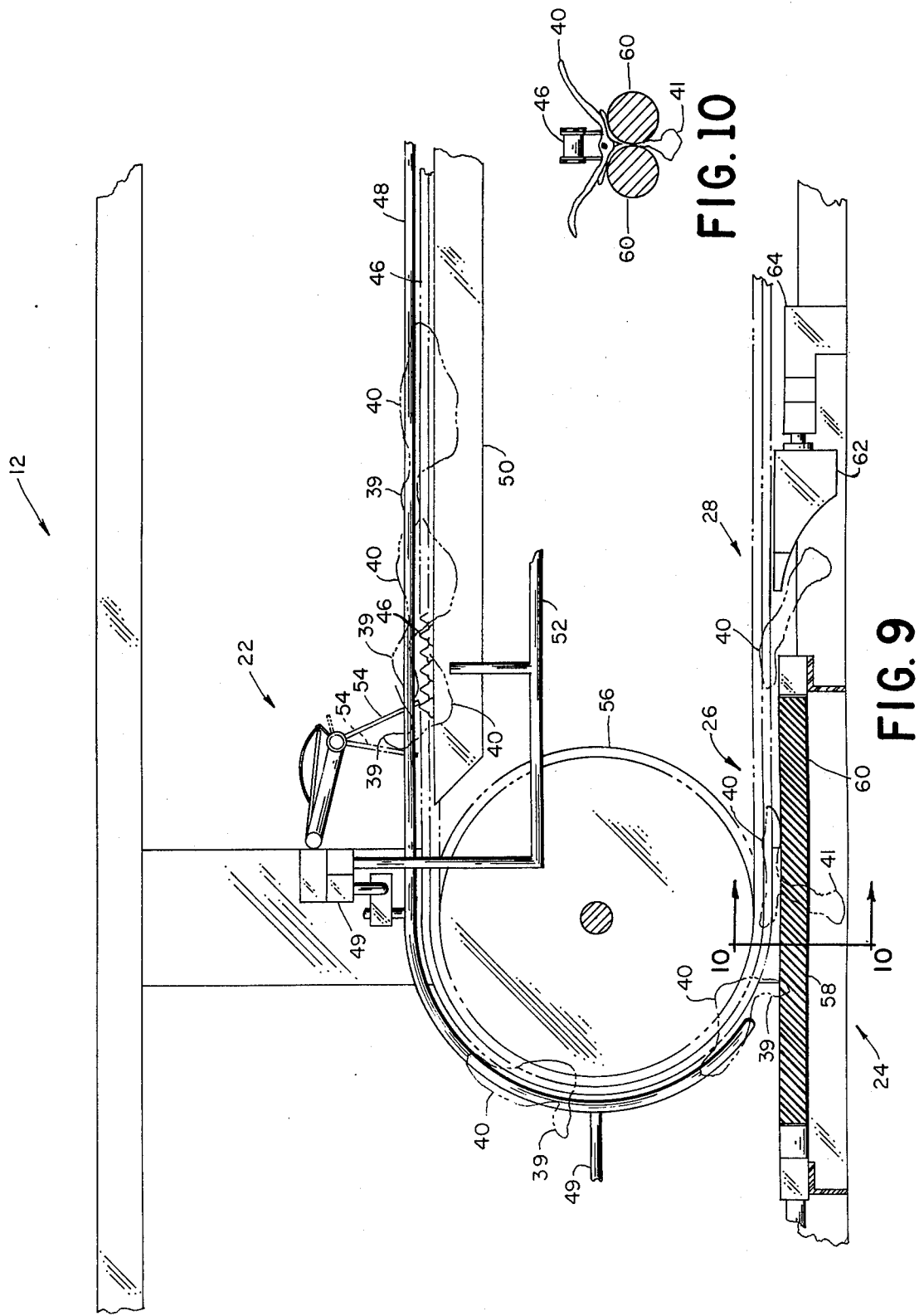

MACHINE FOR PROCESSING THE BACKS OF POULTRY

BACKGROUND OF THE INVENTION

It is to be understood that the present invention pertains to removing skin from the backs of poultry and fowl including old and young chickens, at least small turkeys, ducks, and guineas, but for simplicity; the same are hereinafter defined by the generic term "poultry".

In the commercial processing of poultry for human consumption, after removal of the more choice members of the carcass, such as the breasts, thighs, and/or legs, wings, and necks, the one remaining carcass member is the back section. Since the back member contains a relatively scant amount of lean meat thereon, the meat recovered therefrom has traditionally been employed in combination with other foodstuff ingredients in the preparation of various types of chicken soups and similar products. However, with the advent of a recent government ruling, a certain amount of lean poultry meat may be incorporated into the compounding of frankfurters, as long as the percentage of lean meat so incorporated therein does not exceed an allowable predetermined percentage, whereby the label on such frankfurters which contain such poultry meat therein within the allowable percentage, may indicate that such frankfurters contain all meat. The aforementioned government ruling has thus created a new market and new demand for the relatively inexpensive back meat of poultry which heretofore was utilized in the preparation of other less expensive foodstuffs.

The subject of the instant invention comprises a machine which is designed to automatically remove the kidneys and fatty skin tissue from a series of poultry back carcass members introduced to the machine, so that the processed carcass members delivered from the machine may be employed in foodstuffs in regard to which the controlling regulations require that the poultry meat so utilized comprises only lean, fat-free flesh.

Although various mechanical devices have heretofore been disclosed in patents wherein pairs of rollers having intermeshing helical ribs have been used to remove skin from poultry gizzards, such devices have not included means to accommodate poultry back members or otherwise suggested the use of such machines to remove skin from poultry back members.

Further, while conveyance means similar to those employed in the instant invention and by which poultry back carcass members are transported from the infeed section, through various processing stations of the machine, to the delivery of said machine are shown in prior patents, they are for a different purpose and thus are patentably distinguishable from the present invention. For example, the conveyance mechanism shown in U.S. Pat. No. 3,406,425 to Hill, dated Oct. 22, 1968, and comprising an endless chain impaling conveyor means engages and delivers poultry gizzard members to a set of inwardly and oppositely rotating course gear members in axial alignment with a second set of connected helical gear members, whereby said gizzards are subjected to a skinning operation which macerates the skins. Hence, while the instant invention incorporates a conveyance and skinning operation which has some similarity to that disclosed in the patent to Hill, the sequence of processing events and the processing results obtained by the instant invention are significantly different from those results obtained by the Hill disclosure.

Other patent disclosures also exist which show the employment of helical gear means to remove the skin from poultry gizzard members and macerate the skin. Among such disclosures are those shown in U.S. Pat. No. 3,099,038 to Platt, dated July 30, 1963, as well as U.S. Pat. No. 3,480,991 to Edwards, dated Dec. 2, 1969, and in another patent to Edwards, U.S. Pat. No. 3,579,714 dated May 25, 1971. Again, as heretofore pointed out, the disclosures in the three aforementioned patents specifically employ helical gear means to remove and macerate the protective skin covering from poultry gizzard members. Therefore, since the helical gear members employed in the instant invention are utilized for accomplishing the removal of different skin coverings from different poultry members and include different additional handling mechanism from that of said patents, the present invention is patentably distinguishable from the means disclosed in the aforementioned patents.

Mechanical means for removing the tail section of a poultry back member are revealed in U.S. Pat. No. 3,714,682 to Harben, dated Feb. 6, 1973, wherein poultry back carcass members are individually and manually positioned in the guide section of a set of roller means, one of the rollers of said set having cutting blades affixed thereto, whereby the rotatable engagement of said cutting roller with the tail section of said back carcass members result in the severing of said tail section from said carcass member. Although the end result is the same, i.e., removal of the tail section from the back carcass member by mechanical means, the mechanical means employed in the instant invention and the manner of positioning the tail section for removal, are readily and patentably distinguished over the disclosure shown in the Harben patent.

The vacuum removal of kidneys also has also long been known in the art as set forth in the disclosures in U.S. Pat. No. 3,451,097 to Knight, dated June 24, 1969, and U.S. Pat. No. 3,769,656 to Jahnke, dated Nov. 6, 1973. However, the disclosures set forth in the two aforementioned patents relate to manually operable vacuum devices for the removal of kidneys and other visceral members from the carcass of a chicken or similar type fowl. The absence of automatic viscera membrane retaining severing means, as well as automatic vacuum removal of exposed viscera, neither of which are shown in the patent disclosures of Knight or Jahnke likewise distinguishes the instant invention over these previous two disclosures.

As heretofore pointed out the instant invention is distinguishable from said earlier inventions in one or more ways in that the present invention has utility features and new and useful advantages, applications, and improvements in the art of processing mechanism to remove skin from poultry back members not heretofore disclosed, as set forth hereinafter.

SUMMARY OF THE INVENTION

It is the principal object of the present invention to provide a machine which automatically processes poultry back members fed thereto during a single pass therethrough, for removal of the fatty skin and tail members thereof so that said carcass members may thereafter be further processed for utilization in foodstuffs which require lean mean and no fat.

It is another object of the present invention to provide a machine which also automatically severs the kidney retaining membranes in the upper interior cavity section of said carcass members by angled blade elements of said machine, whereafter the exposed kidney organs are automatically removed by vacuum means.

A further object of the present invention is to eliminate the certain manual steps in processing poultry back carcass members as heretofore employed, thereby resulting in a significant reduction in processing time and a significant increase in processing output not heretofore realized during poultry back processing operations.

It is still another object of the present invention to provide a poultry back processing machine which is safe and simple in operation, as well as a machine which requires a minimum of make-ready time in addition to a machine which may be set, operated, and tended by an average employee not possessed of special skill or training.

BRIEF DESCRIPTION OF THE DRAWINGS

FIG. 9 is an enlarged side elevation of the tail flipping, tail removal, skin removal, and carcass removal stations as seen along the line 9 — 9 of FIG. 2.

FIG. 10 is an enlarged end elevation of the skin removal station as seen along the line 10 — 10 of FIG. 9.

DETAILED DESCRIPTION OF THE INVENTION

Figure 1:
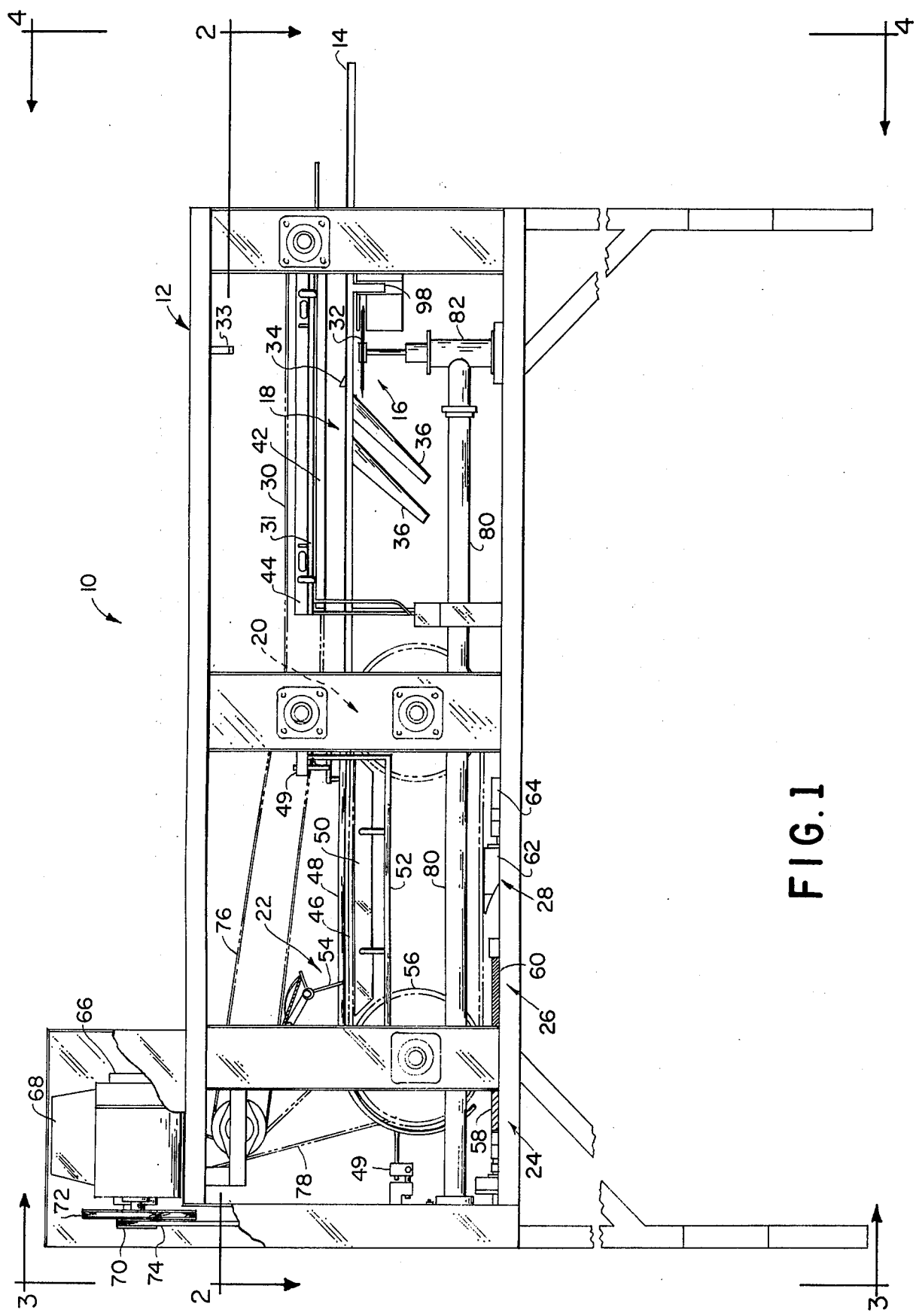
FIG. 1 is a side elevation of a poultry back processing machine embodying the principles of the present invention.

Referring to FIG. 1, the present invention is shown which comprises a poultry back processing machine 10 having a supporting frame structure 12 generally comprised of interconnected horizontally and vertically disposed members, an infeed rail member 14 upon which unprocessed poultry back carcass members are tandemly placed in a tail-leading position relative one to the other and thereafter sequentially conveyed by mechanical means to an excess skin removal station 16, a kidney membrane severing and vacuum removal station 18, a transfer station 20, a tail flipping station 22, a tail removal and maceration station 24, a back skin removal and maceration station 26, and a processed carcass deflection station 28, the entire combination of which is designed to automatically remove by mechanical means the kidneys, tail, and skin from a poultry back carcass member manually introduced thereto.

Referring again to FIG. 1 to explain in greater detail the operation and functioning of this machine, the initial step in processing sequence involves taking unprocessed poultry back members remaining from previous processing operations, which poultry back members have remaining thereon the kidneys, tail, and back skin, all of which are sequentially removed by related supplementary processing stations within the machine combination upon manual introduction of said poultry back carcass members to said machine tail first. The configuration of manual delivery of said unprocessed poultry back carcass members to said machine is tandem alignment with tail stations thereof foremost, the carcass cavity openings thereof down, and the uppermost interior sections of said cavity opening slidably engaging said infeed rail member 14 to be thereafter mechanically engaged upon the uppermost exterior back surface thereof and mechanically conveyed into said machine 10 by the first impaling conveyor means 30, comprised of a set of laterally disposed impaling conveyor members. The poultry back carcass members so engaged are retained in position between said rail 14 and a back hold down guide 31 and are slidably advance to the excess skin removal station 16, comprised of a set of rotating circular knives 32, by which excess depending skin is automatically severed from said poultry back carcass members as said carcass members are conveyed through said station. Positioned above said circular knives 32, primarily for purposes of sanitization, is a cold water spray nozzle 33. Immediately following the excess skin removal station 16, the kidney membrane severing and vacuum removal station 18 is comprised of a set of triangular shaped angularly positioned stationary blade members 34 which engage and sever the kidney retaining membrane tissues on either side of the uppermost interior back section of the carcass members as said carcass members are slidably conveyed over and past said stationary blade members 34. Immediately following such severing operation a dual pair of tandemly positioned vacuum tubes 36 are positioned to automatically remove the exposed kidney organs from the poultry back carcass members by vacuum means.

Figure 11:
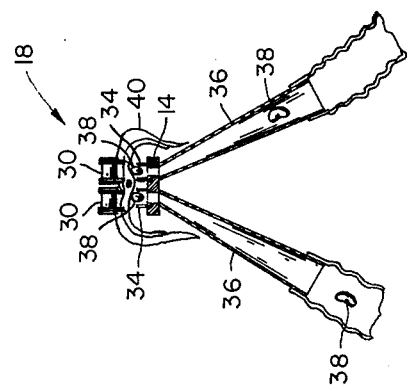
FIG. 11 is an enlarged fragmentary end elevation of the kidney removal station as seen in FIG. 1.

The kidney membrane severing and vacuum removal station 18, as heretofore described, is more clearly illustrated in the enlarged fragmentary end view shown in FIG. 11, wherein is also shown the relative position of exemplary kidney organs 38 in an exemplary poultry back carcass member 40, as well as the relative position of the mechanical elements of station 18 by which automatic kidney organ removal from said poultry back carcass members 40 is accomplished. It should be noted that the first impaling chain conveyor means 30, by which slidable mechanical conveyance of poultry back carcass members is accomplished through the initial processing stages, is guided by a backer 42 which is held in position by a backer support 44.

Figure 8:
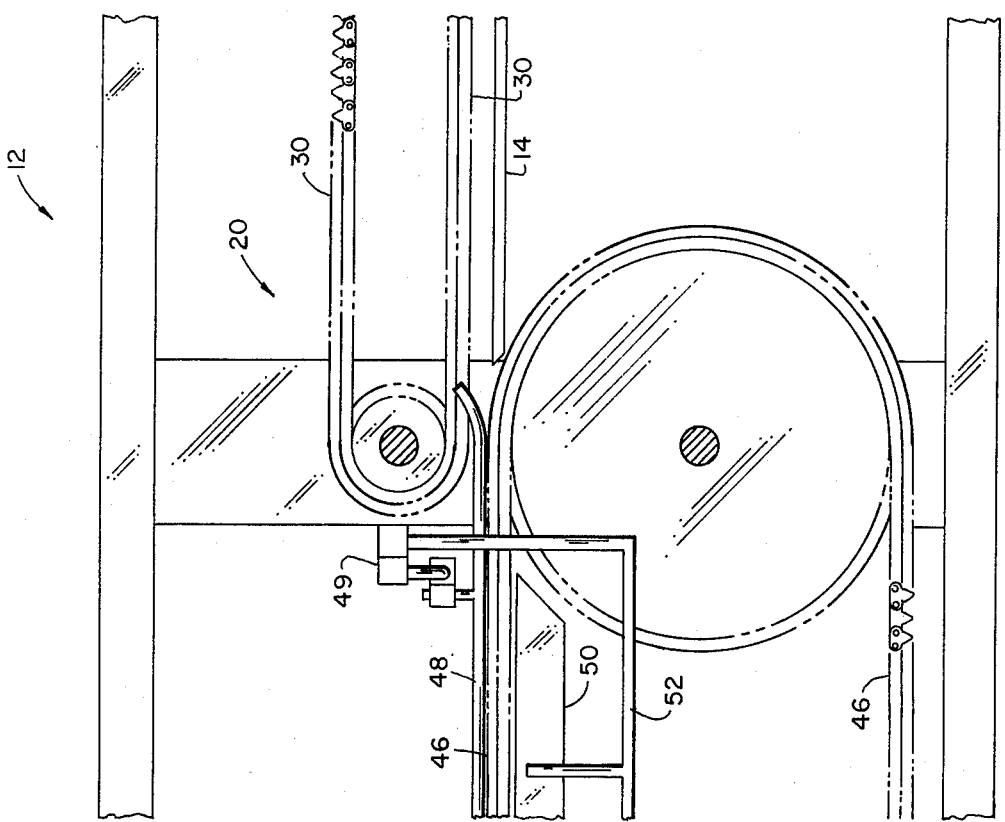
FIG. 8 is an enlarged side elevation of the transfer station as seen along the line 8 — 8 of FIG. 2.

After removal of the kidneys, the poultry back carcass members are conveyed by means of said first impaling conveyor 30 to a transfer station 20, which is not specifically seen in FIG. 1, but is shown in detail in enlarged side elevation, in FIG. 8. The purpose of the transfer station is to disengage the first impalement conveyor means 30 from said poultry back carcass members along the uppermost exterior back surface thereof and reengage said poultry back carcass members by means of a second impalement conveyor 46 which engages said carcasses from the underside of the uppermost interior surfaces thereof so that the remaining processing steps may be performed on the exterior surface of said poultry back carcass members.

Referring to FIG. 8, it will be seen that the partially processed poultry back carcass members are slidably conveyed by the first impaling conveyor means 30 to the end of the infeed rail member 14, whereupon said carcass members are held in position by means of the horizontally disposed back positioning and hold down guides 48 which are held in position by guide supports 49, and simultaneously disengaged from said first impaling conveyor means 30, while being transported through the transfer station 20, and are guided onto said second impalment conveyor 46 which engages the uppermost interior back surfaces. Thereafter, said poultry back carcass members are slidably conveyed along said back positioning and hold down guides 48 by means of said second impalement conveyor 46 for further processing operations. It should also be noted that the chain transport member of the second impalement conveyor is likewise guided by a chain backer 50 held in position by a backer support 52.

After transport through the transfer station 20, said partially processed poultry back members are conveyed by second conveyor 46 to the tail flipping station 22, where the essentially horizontal forward leading tails of the poultry back carcass members are engaged by a set of depending tensioned rod members 54 and forced thereby to an essentially vertical position, in which posture said tail members are retained by the laterally spaced back positioning and hold down guide rail members 48, all of which is clearly shown and illustrated in FIG. 9. Said poultry back members are then conveyed around the second impalement conveyor drive sprocket 56 to an inverted position where the erected tail members are brought into engagement with a set of coarse helical gears 58 of the tail removal and maceration station 24, said gears 58 having directions of rotation inwardly and opposite each other, whereby the tails of said carcass members are mechanically engaged and snatched from the carcass members.

Immediately following the tail removal station 24 is the back skin removal and maceration station 26, which is comprised of a second set of relatively fine helical gears 60 which are in axial alignment with the coarse set of helical gears, and likewise rotate inwardly and opposite each other, whereby the back skin of said carcass members is engaged thereby and is removed from said carcass members and is macerated. Upon delivery of the processed poultry back carcass members from the back skin removal station 26, said carcass members are engaged by deflector 62 of the carcass deflection station 28, said deflector being held in position by a deflector support member 64, whereby the processed chicken back carcass members are disengaged from the second impalement conveyor 46 and delivered to a suitable receptacle, not shown.

Other components of said poultry back processing machine 10, which are not elements of the actual processing stations per se, but supplement the same, as heretofore described, include the drive motor 66, a main gear box 68, a motor drive sprocket 70, and a main gear box driven sprocket 72. Also shown is the helical gear drive chain 74, the first conveyor drive chain 76 and the secondary conveyor drive chain 78, as well as the circular knife drive shaft housing 80 and the right angle gear box 82 by which rotary motion is imparted to the circular knives 32.

The machine 10 as disclosed in FIG. 1, as well as the other views heretofore discussed, may be constructed of metal, or plastic, or any other suitable materials or a combination thereof.

Figure 2:
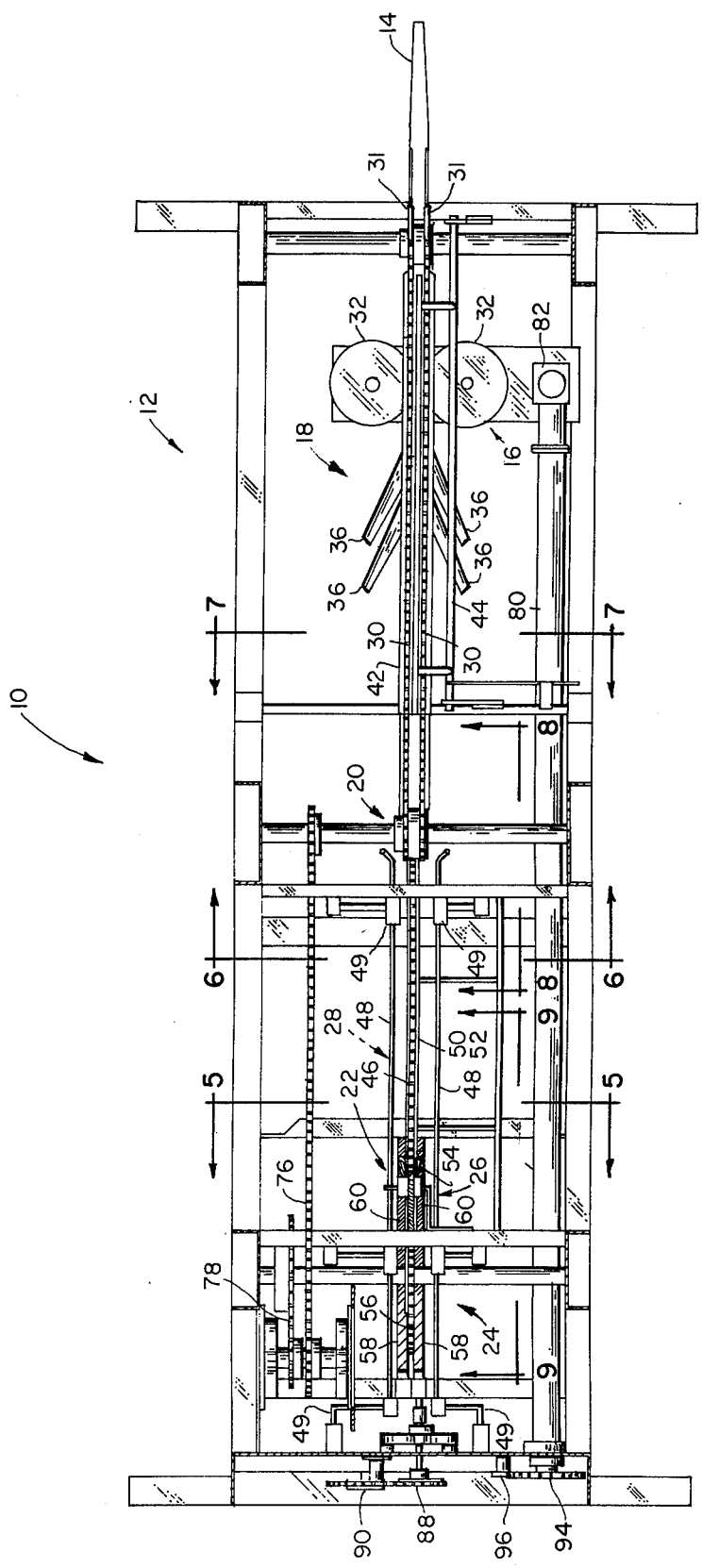
FIG. 2 is a top plan view of the machine as seen along the line 2 — 2 of FIG. 1.

In FIG. 2 a top plan view of the side elevation shown in FIG. 1, as seen along the line 2 — 2 thereof, is detailed wherein there is seen a complimentary configuration of the component processing stations of machine 10 and the elements comprising the same as heretofore described and discussed.

Figure 3:
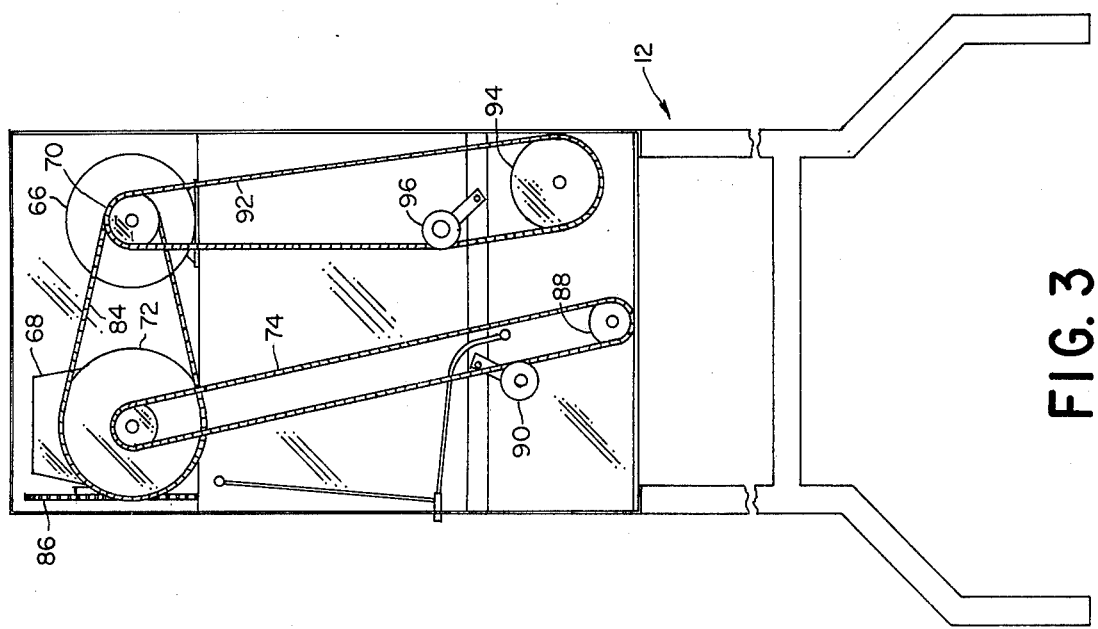
FIG. 3 is an end elevation of the machine as seen along the line 3 — 3 of FIG. 1.

In FIG. 3, an end view of said machine 10, as seen along the line 3 — 3 of FIG. 1, is shown wherein details of the power and drive transmitting members are more particularly disclosed. In addition to the drive motor 66 which is connected to the main gear box 68 by the motor drive chain 84, there is also shown the main drive sprocket 86 by which power is transmitted to drive the first and second impaling conveyors 30 and 46. The helical gear drive chain 74 operates off the main gear box 68 to drive the helical gears by means of the helical gear drive sprocket 88. An adjustable helical gear drive chain idler roller 90 is provided to maintain chain tension. The circular knife drive shaft drive chain 92 operates directly off the motor drive sprocket 70 to drive said knife drive shaft by means of the circular knife drive shaft sprocket 94. Likewise, an arcuately adjustable idler roller 96 for the drive chain idler for the circular knife drive shaft is provided to maintain chain tension.

Figure 4:
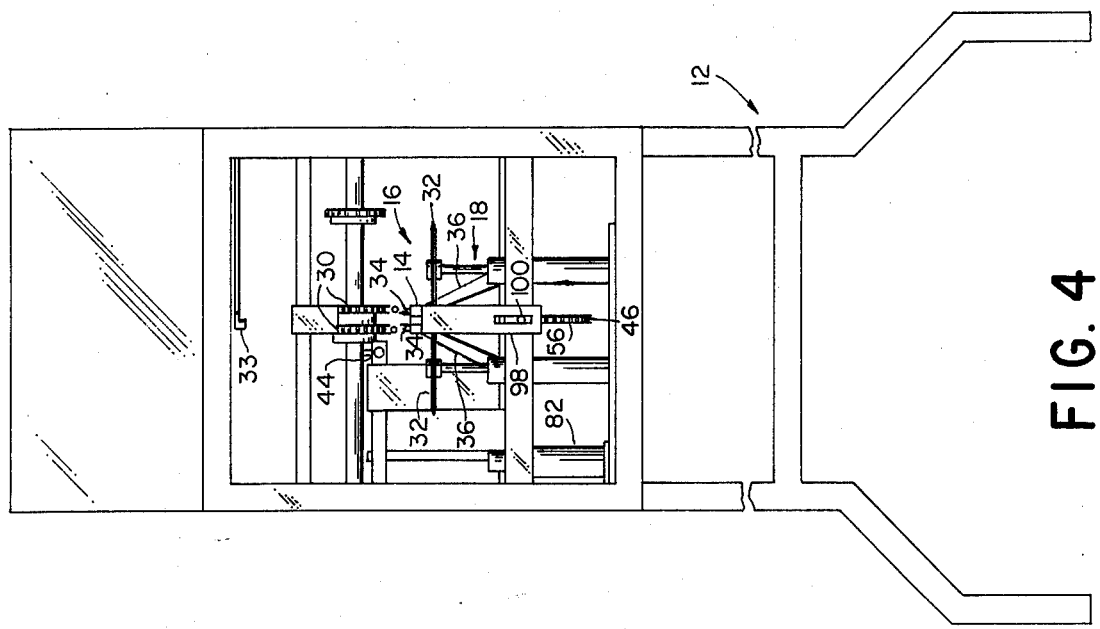
FIG. 4 is an end elevation of the machine as seen along the line 4 — 4 of FIG. 1.

The view shown in FIG. 4 is of an infeed end section of machine 10 as seen along the line 4 — 4 of FIG. 1, showing machine components heretofore discussed and described, in addition to showing the front infeed rail support member 98 vertically adjustable by means of the slot and bolt assembly 100.

Figure 7:
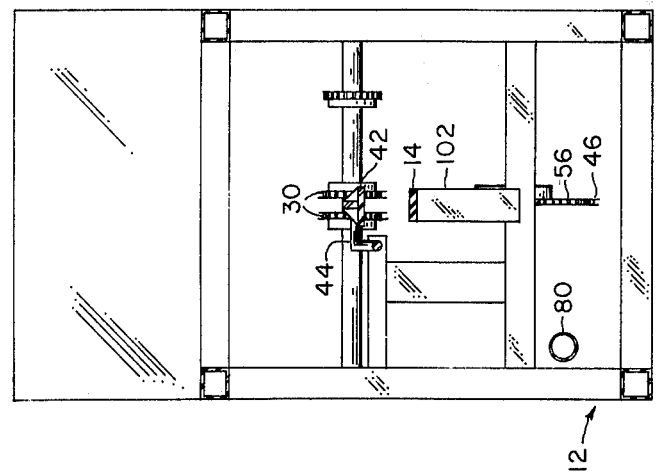
FIG. 7 is a fragmentary elevation of the machine as seen along the line 7 — 7 of FIG. 2.
Figure 6:
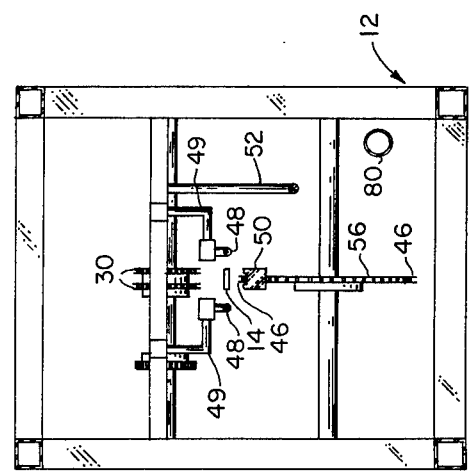
FIG. 6 is a fragmentary elevation of the machine as seen along the line 6 — 6 of FIG. 2.
Figure 5:
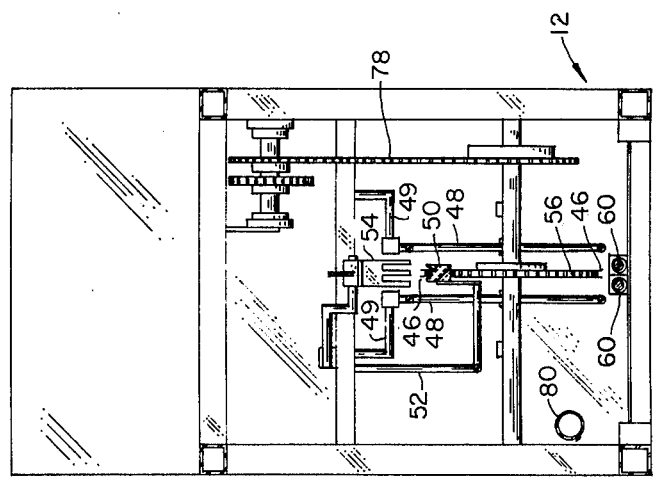
FIG. 5 is a fragmentary elevation of the machine as seen along the line 5 — 5 of FIG. 2.

The views shown in FIGS. 5, 6, and 7 are sections along respectively designated lines of FIG. 2, and show alternate views of components of machine 10 heretofore discussed and described. However, in FIG. 7 there is additionally shown the stationary rear infeed rail support member 102.

The views shown in FIGS. 8 and 11 are described in detail above in the discussion accompanying the description of FIG. 1. Likewise, the view shown in FIG. 9, being an enlarged section along the line 9 — 9 of FIG. 2, is also discussed above and described in detail. However, additionally shown in FIG. 9 are exemplary poultry back carcass members 40 and the general configuration of said carcass members 40 as they are conveyed through the tail flipping, tail removal, skin removal, and carcass deflecting stations by the second impalement conveyor 46. It will be noted that the tail sections 39 of said carcass members 40 are facing forward in a generally horizontal configuration prior to engagement by the depending tensioned rod members 54 of the tail flipping station 22. Upon engagement of said tail sections 39 by said depending tensioned rod members 54, said tail sections are forced to an essentially vertically erect position and said tail sections are maintained in such position by forward slidable advancement of said carcass members 40 with said tail sections thereof being laterally held by and between the back positioning and hold down guides 48. Thus, said tail sections 39 are properly positioned for engagement by the coarse helical gears 58 of the tail maceration and removal station 24, and subsequent thereto, the back skin 41 is likewise properly positioned for engagement by the fine helical gear members 60 of the back skin removal and maceration station 26, an enlarged end view section of which is shown in FIG. 10.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A machine for processing the back carcass members of poultry and comprising a frame structure to support processing stations within said machine for removing the tails and skin from the backs of a progressive series of poultry back carcass members while making a single pass through said machine comprising in combination, a feed rail member upon which unprocessed poultry back carcass members are tandemly positioned by manual means with the tail foremost and the uppermost interior of the cavity section of said carcass members slidably positioned upon said rail member, conveyor means engageable with the upper surfaces of said carcass members to move the same along said rail member to a transport station, an inverting endless flexible conveyor and rail section supported by said frame, a pair of circular sprockets supporting said conveyor for movement of a span thereof substantially horizontally and parallel to said rail section, means to transfer said back carcass members to said rail section from said feed rail member, a tail flipping means at a flipping station intermediately of the ends of said rail section and engageable with the tail uppermost on each carcass and operable to mechanically force said tail from an essentially horizontal position to a substantially upstanding erected position, means to invert said carcass members while supported and moved by said conveyor to bring the erected tails of said carcass members into depending position relative to said carcass, a set of coarse oppositely and inwardly rotating helical gear members positioned and operable to engage said tails and mechanically macerate and snatch the same from said back carcass members, a set of less coarse oppositely and inwardly rotating helical gear members operable to engage the skin on said back carcass member and mechanically macerate and remove the same from said carcass member, and means to discharge said carcass members from said machine.

2. A poultry back processing machine in accordance with claim 1, wherein the poultry back carcass members when positioned upon said rail member are engaged upon the uppermost surface of the exterior surface of the back members by said endless flexible conveyor mechanism and said conveyor mechanism having impaling means thereon which positively engage and slidably propel said carcass members along said rail member.

3. A poultry back processing machine in accordance with claim 1, wherein the means to invert said carcass members is comprised of a set of curved guide rail sections laterally spaced a discrete distance from each other and against which said carcass members are conveyed slidably while held thereagainst the interior surfaces of said curved guide rail members from a horizontal configuration in which the backs are uppermost to a horizontal position in which said backs are inverted.

4. A poultry back processing machine in accordance with claim 3 in which said endless flexible conveyor propels said back carcass members slidably along said curved guide rail members and said endless flexible conveyor having impaling means thereon positioned to positively engage the innermost interior portions of said back sections and thereby slidably propel said carcass members around the interior curvature of said curved rail sections.

5. A poultry back processing machine in accordance with claim 1 further including a kidney membrane slicing station positioned along said feed rail member and including angularly positioned blade means operable to sever the interior carcass cavity kidney retaining membranes at either interior side of said carcass member, and vacuum means operable to remove said kidneys from said carcass member automatically incident to moving said carcass member along said feed rail member.

6. A poultry back processing machine in accordance with claim 1, wherein said helical gears to remove said back skin are rotatable in opposite inward directions to cause the uppermost surfaces thereof to move toward each other and the spiral helical ribs thereon intermeshing with each other and engage and remove said back skin from said carcass members and macerate said skin.

7. A poultry back processing machine in accordance with claim 1 in which said means to flip the tail of said back carcasses is adjacent the leading end of said carcass inverting means and comprises an angularly depending rod pivotally supported by said frame and arranged to engage and force said tails of said carcass members to an essentially vertical erect position relative to the longitudinal axis of said back carcass and said means to invert said carcasses comprising curved guide means operable to hold said tail sections in said erect position while said carcass members are slidably advanced to said tail engaging gear members which snatch said tails from said carcasses.

8. A poultry back processing machine in accordance with claim 7, wherein said spiral gear means to remove tails comprise spiral rib means extending from the leading end thereof and axially ahead of the leading end of skin engaging spiral gear means and having wider spaces between the spiral ribs thereof than between the ribs of said skin engagement spiral gears to accommodate the bulk of said tails incident to snatching the same from said carcasses as said carcass members are conveyed over said spiral rib means in inverted position thereon.

* * * * *